Jan. 23, 1951     E. HARDESTY     2,539,245
METHOD OF FORMING CERAMIC ARTICLES
Filed Dec. 3, 1947
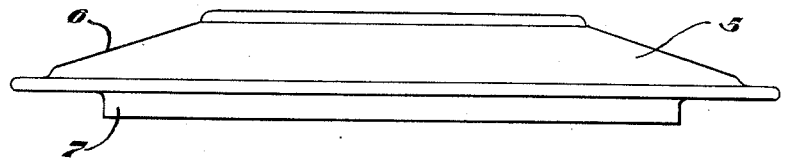
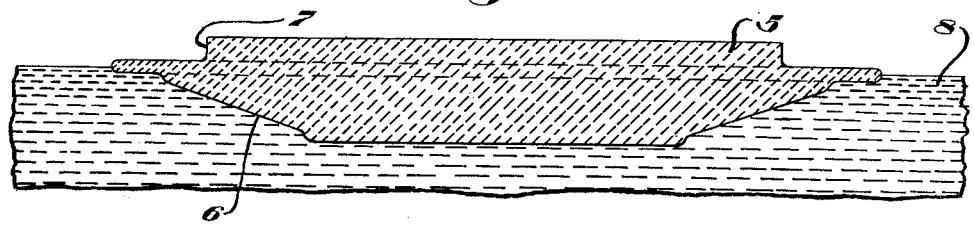
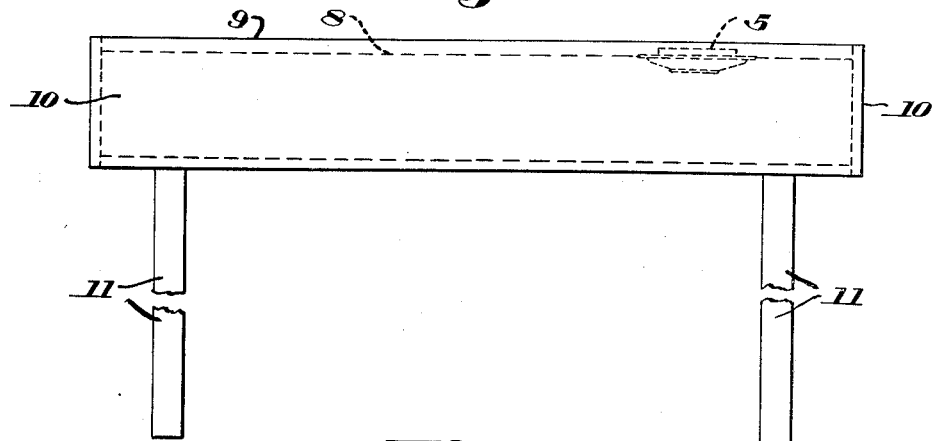
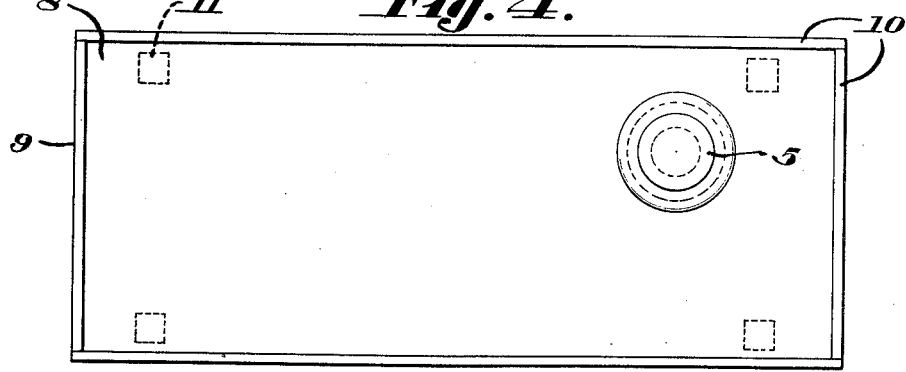
INVENTOR
EUGENE HARDESTY, DECEASED,
BY ANN C. HARDESTY, ADMINISTRATOR.

Patented Jan. 23, 1951

2,539,245

UNITED STATES PATENT OFFICE 2,539,245

METHOD OF FORMING CERAMIC ARTICLES

Eugene Hardesty, deceased, late of New Brighton, Pa., by Ann C. Hardesty, administrator, New Brighton, Pa.

Application December 3, 1947, Serial No. 789,423

2 Claims. (Cl. 25—156)

This invention relates to a method of forming ceramic articles which are subsequently fired to vitrify the material from which they are made. It is particularly useful in manufacturing extremely light thin china articles such as are known as "fine dinnerware." Heretofore dinnerware which is so thin as to be translucent has not, to the best of my knowledge, been made in the United States. It has been made in foreign countries such as Germany or Japan but not on a production basis. Potters in those countries have simply fired large quantities of china, selected those pieces which were satisfactory and scrapped the balance. During firing many pieces were cracked or shattered. The result was that only a few pieces out of several gross which were placed in the kiln for firing would be satisfactory. This is one of the reasons why such fine china has been very expensive.

By using the process here described and claimed it is possible to make extremely thin fine china on a production basis with relatively small scrap losses. The process is based on the discovery that many of the difficulties encountered in making fine china have been caused by the processes heretofore used to form the articles prior to firing.

It has long been and now is standard practice to form or shape pieces to be fired by first making a mold of plaster of Paris, one surface of which conforms to the face desired for the ultimate china piece, due allowance being made for shrinkage during firing. An open ended sheet metal cylinder called a "coddle" is then placed around the mold so that the mold closes one end of the cylinder.

A quantity of "casting slip" is then poured into the coddle. The slip is a "body" (clay mixture containing approximately 25% water) to which has been added a deflocculent in sufficient amount to make the mixture liquid without additional water. The slip has a consistency such that it can readily be poured from one container to another.

Since the mold is made of plaster of Paris it absorbs water and this causes a layer of clay mixture to adhere to the surface of the mold. The thickness of the clay mixture on the mold is determined solely by the length of time that the mold is covered with the slip since this determines the amount of water which the mold will absorb. After the desired thickness of clay mixture is deposited on the mold the slip is emptied out of the coddle. The coddle is removed and the clay material is dried on the mold until it can be removed from the mold as a "green" clay piece.

The inventor of the process described and claimed in this application believed that the practice described above sets up strains in the formed pieces of clay mixture which cause the articles to shatter or crack during firing, particularly if the articles are not evenly heated and cooled. The new process herein described and claimed apparently avoids these strains because articles which have been formed using the process can be fired on a production basis without shattering or cracking.

In the accompanying drawings there are illustrated apparatus useful in carrying out the process, in which Figure 1 is a front view of a typical mold which is used in the process;

Figure 2 is a central vertical section through the mold shown in Figure 1 and showing the position of the mold in the slip;

Figure 3 is a front elevation of apparatus for holding the slip showing one mold in the slip; and Figure 4 is a plan view of the apparatus shown in Figure 3.

In carrying out the new process for forming ceramic articles for firing, a plaster of Paris mold 5 is first made in accordance with known practices. The mold has a top surface 6 and a base or pedestal portion 7. The top surface 6 is made to conform to the contour of the face of the final china piece (due allowance being made for shrinkage during firing). If cups are to be formed the surface 6 is made to conform to the interior surface of the cup.

The mold 5 is then placed or floated in a body of casting slip in an inverted position, i. e., the surface 6 of the mold faces downwardly into the slip 8.

The slip is made with a density such that the plaster of Paris mold floats in the slip as shown in Figure 2 and absorbs water from the slip which is adjacent to the mold. The clay mixture from which water has been absorbed adheres to the mold, the thickness of the material increasing proportionately to the time that the mold remains in the slip. When the desired thickness of clay mixture on the mold is obtained the mold is withdrawn and the clay mixture is shaped on a jigger. Thereafter the clay piece is dried, removed from the mold, finished, and fired in accordance with conventional practice.

Figures 3 and 4 illustrate equipment which can be used to hold a body of slip into which the molds can be dipped. As shown in these figures the equipment comprises a rectangular trough 9 the sides 10 of which are sufficiently high to hold a working quantity of slip, yet not so high as to make it awkward to place molds in the slip. In practice it has been found that height of 8 inches is satisfactory. Legs 11 support the trough at a convenient working height from the floor of the pottery.

Extremely fine china so thin as to be translucent has been made by forming the green clay pieces to be fired in accordance with the process described above. The clay pieces have been fired on a production basis and very little shattering or cracking occurred. As stated above it is believed that such results are obtained because no strains are placed on the clay pieces while they are being formed.

While a present preferred method of carrying out the process has been set out above, it is to be understood that the invention may be otherwise embodied within the scope of the appended claims.

It is claimed:

1. The process of forming a ceramic article which includes dipping a mold of the article in casting slip, withdrawing the mold when the desired amount of clay mixture has adhered to the surfaces of the mold, and shaping the clay mixture on a jigger before removing the mixture from the mold.

2. The process of forming a ceramic article which includes shaping one side of a mold to the contour of the face surface of the article and the other side of the mold to the shape of a pedestal which can be mounted on a jigger, floating the mold in casting slip with the contoured side downward and with the pedestal above the level of the slip, removing the mold when the desired amount of clay mixture has adhered to the downwardly facing surface of the mold, and shaping on a jigger the outer surface of the clay mixture while it is on the mold.

ANN C. HARDESTY,
*Adminstrator C. T. A. of the Estate of Eugene Hardesty, Deceased.*

REFERENCES CITED

The following references are of record in the file of this patent:

UNITED STATES PATENTS

| Number | Name | Date |
| --- | --- | --- |
| 1,882,191 | Purinton | Oct. 11, 1932 |